US012620911B2

(12) United States Patent
Wong et al.

(10) Patent No.: US 12,620,911 B2
(45) Date of Patent: May 5, 2026

(54) PARALLEL MULTI-CONVERTER AND CAPACITY DESIGN METHOD THEREFOR

(71) Applicant: University of Macau, Macau (CN)

(72) Inventors: Man-Chung Wong, Macau (CN); Ying Pang, Macau (CN)

(73) Assignee: University of Macau, Macau (CN)

( * ) Notice: Subject to any disclaimer, the term of this patent is extended or adjusted under 35 U.S.C. 154(b) by 772 days.

(21) Appl. No.: 17/902,064

(22) Filed: Sep. 2, 2022

(65) Prior Publication Data

US 2024/0097579 A1    Mar. 21, 2024

(51) Int. Cl.
H02M 7/53 (2006.01)
H02M 1/00 (2006.01)
(Continued)

(52) U.S. Cl.
CPC ....... H02M 7/5387 (2013.01); H02M 1/0009 (2021.05); H02M 7/4815 (2021.05)

(58) Field of Classification Search
CPC .... H02M 3/1582; H02M 3/156; H02M 3/157; H02M 3/158; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466;
(Continued)

(56) References Cited

FOREIGN PATENT DOCUMENTS

CN      100477442 C    4/2009
CN      101499663 A    8/2009
(Continued)

OTHER PUBLICATIONS

Pang et al., "A Fusion Topology of Higher Efficiency and Lower Capacity Hybrid Parallel Multi-Converters for Power Quality Compensation", May 2022, IEEE vol. 37 No. 5, pp. 5957-5969 (Year: 2022).*

(Continued)

*Primary Examiner* — Jeffrey A Gblende
(74) *Attorney, Agent, or Firm* — Westbridge IP LLC

(57) ABSTRACT

Disclosed are a parallel multi-converter and a capacity design method therefor. A first output current model and a second output current model are generated by respectively acquiring electrical parameters of an inductive voltage source converter and a capacitive voltage source converter, and the first output current model and the second output current model are integrated under the same output current condition, so that it may be ensured that the inductive voltage source converter and the capacitive voltage source converter have the same current generating ability; meanwhile, a coupling inductance relationship between the inductive voltage source converter and the capacitive voltage source converter is combined to further obtain the optimal capacity value of the inductive voltage source converter and the optimal capacity value of the capacitive voltage source converter. Therefore, the L-VSC and the LC-VSC have the same current generating ability, and the multi-converter has lower total voltage capacity.

8 Claims, 7 Drawing Sheets

(51) Int. Cl.
H02M 7/48          (2007.01)
H02M 7/5387          (2007.01)
(58) Field of Classification Search
CPC ........... H02M 7/5387; H02M 7/53871; H02M
7/53873; H02M 7/53875; H02M 1/084;
H02M 1/0845; H02M 1/007; H02M
1/0009; H02M 1/0095; H02M 1/08;
H02M 1/088; H02M 3/1588; H02M
7/5395; H02M 1/14; H02M 1/0043;
H02M 1/0074; H02M 1/0077; H02J 3/46;
H02J 3/38
See application file for complete search history.

(56)          References Cited

FOREIGN PATENT DOCUMENTS

| CN | 102842921 B | 7/2014 |
|---|---|---|
| CN | 109327147 A | 2/2019 |
| CN | 112436729 A | 3/2021 |

OTHER PUBLICATIONS

Milanes-Montero et al., "Hybrid Multiconverter Conditioner Topology for High-Power Applications", 2011, IEEE, vol. 58, No. 6, pp. 2283-2292. (Year: 2011).*

Asiminoaei et al., Shunt Active-Power-Filter Topology Based on Parallel Interleaved Inverters, IEEE Transactions on Industrial Electronics, vol. 55, No. 3, pp. 1175-1189, dated Mar. 31, 2008.

Bai et al., Harmonic Analysis and Mitigation of Low-Frequency Switching Voltage Source Inverter With Auxiliary VSI, IEEE Journal of Emerging and Selected Topics in Power Electronics, vol. 6, No. 3, pp. 1355-1365, dated Sep. 30, 2018.

Milanés-Montero et al., Hybrid Multiconverter Conditioner Topology for High-Power Applications, IEEE Transactions on Industrial Electronics, vol. 58, No. 6, pp. 2283-2292, dated Jun. 30, 2011.

Pang et al., A Fusion Topology of Higher Efficiency and Lower Capacity Hybrid Parallel Multi-Converters for Power Quality Compensation, IEEE Transactions on Power Electronics, vol. 37, No. 5, pp. 5957-5969, dated May 31, 2022.

* cited by examiner

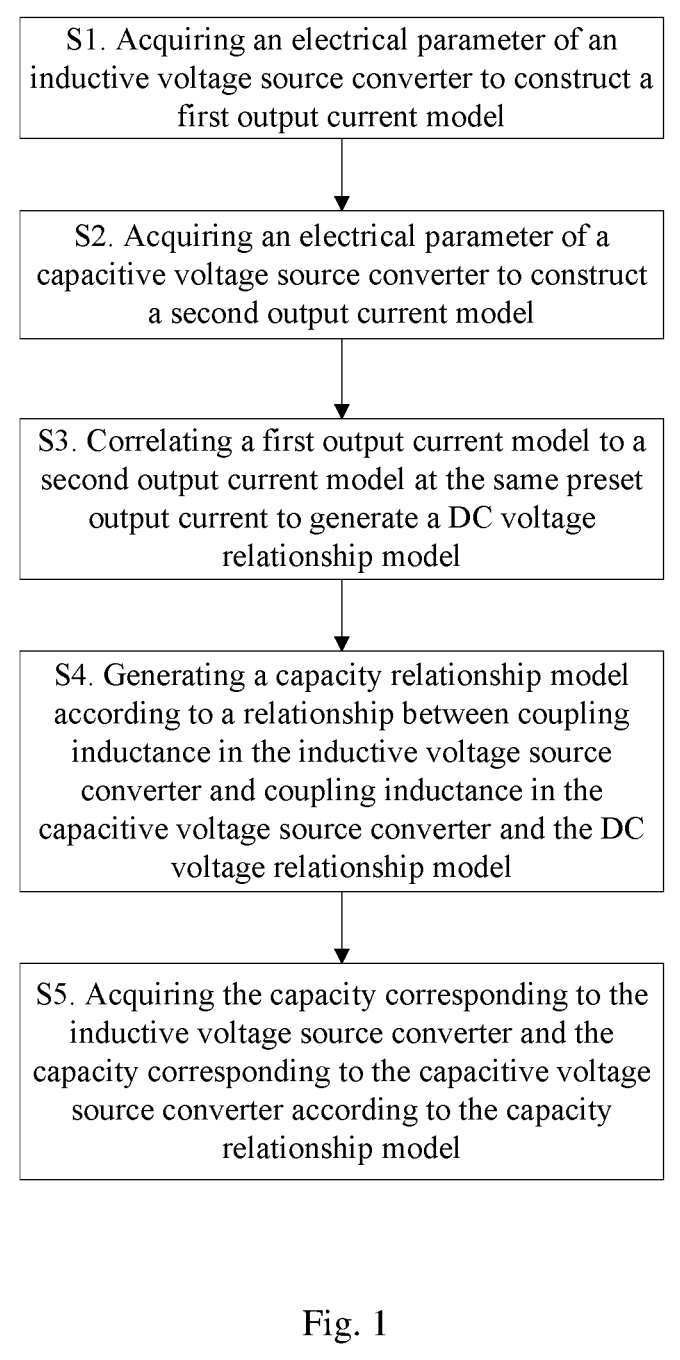

S1. Acquiring an electrical parameter of an inductive voltage source converter to construct a first output current model S2. Acquiring an electrical parameter of a capacitive voltage source converter to construct a second output current model S3. Correlating a first output current model to a second output current model at the same preset output current to generate a DC voltage relationship model S4. Generating a capacity relationship model according to a relationship between coupling inductance in the inductive voltage source converter and coupling inductance in the capacitive voltage source converter and the DC voltage relationship model S5. Acquiring the capacity corresponding to the inductive voltage source converter and the capacity corresponding to the capacitive voltage source converter according to the capacity relationship model

Fig. 1

PARALLEL MULTI-CONVERTER AND CAPACITY DESIGN METHOD THEREFOR

TECHNICAL FIELD

The present disclosure relates to the field of circuit design, in particular to a parallel multi-converter and a capacity design method therefor.

BACKGROUND

With the construction of ultra-high voltage transmission lines, the load of high-power industrial power (especially motors, electric heaters, etc.) has increased significantly, and therefore, high-power converters that need to be matched are also in urgent need of development. Among them, an important function of the high-power converters is to control power quality problems at high power. The power quality problems have been widely valued by the industrial community. An APF (active power filter) consisting of a VSC (Voltage Source Converter) is used. As an effective and important means for solving the power quality problems, the APF is one of hot topics in current academic research. Solving the power quality problems in a high-power environment and studying the importance of a power compensator are mainly reflected in the following two aspects.

Firstly, the operation of nonlinear loads inevitably causes power quality problems such as low power factor, harmonic pollution, and three-phase imbalance. The power quality problems may not only increase the transmission loss, but also reduce the reliability, safety, and life cycle of electronic equipment.

Secondly, for common high-power electrical equipment, such as large-scale power transmission and transformation equipment, high-speed trains, and large computers, most of them have extremely high economic and even strategic values, and therefore, it is extremely important to protect them. For maintaining their uninterrupted operation, the dynamic performance of an electric energy compensator must be guaranteed. At the same time, an energy compensator has inherent loss, and if its loss can be minimized, the total efficiency of the energy compensator will be increased.

For existing high-power compensation solutions, if the capacity of the compensator needs to be expanded, it is common practice to use several identical inductive voltage source converters (L-VSCs) in parallel to expand the current capacity of the compensator. Due to material and technical limitations, the maximum current that can pass through each VSC device is limited, and the higher the maximum current, the higher the manufacturing cost. Therefore, a shunt method is usually used to reduce the current passing through each power switch. The disadvantages of this shunt method are also very obvious. Its manufacturing cost is increased proportionally with the increase in demand capacity, and thus, the difficulty of its control will be greatly increased. On the other hand, in medium and low power application scenarios, there is a capacitive voltage source converter (LC-VSC) that is composed by connecting capacitive passive devices and VSCs in series. In the prior art, there is a technical solution that the overall capacity of the method is expanded by parallel connection between the L-VSC and the LC-VSC, but the manner that the capacity and parameters of the L-VSC and the LC-VSC should be designed to make the LC-VSC and the L-VSC have the same current generating ability has not been mentioned in the prior art.

In recent years, patent disclosures and papers in the field of parallel high-power power quality compensators and converters are reviewed and compared as follows:

In the prior art [1] (L. Asiminoaei, E. Aeloiza, P. N. Enjeti, and F. Blaabjerg, "Shunt Active-Power-Filter Topology Based on Parallel Interleaved Inverters," IEEE Transactions on Industrial Electronics, vol. 55, no. 3, pp. 1175-1189, March 2008, doi: 10.1109/TIE.2007.907671), a method for scaling the capacity of multiple parallel converters was firstly proposed, but it was simply a simple direct parallel connection of multiple L-VSCs with high direct current (DC) voltages.

Based on this structure, in the prior art [2] (M. I. Milanés-Montero, E. Romero-Cadaval, and F. Barrero-González, "Hybrid Multiconverter Conditioner Topology for High-Power Applications," IEEE Transactions on Industrial Electronics, vol. 58, no. 6, pp. 2283-2292, June 2011, doi: 10.1109/TIE.2010.2062478), a method for parallel connection between an L-VSC and an LC-VSC was proposed for the first time, which combines with a method for setting a resonance point of a passive part C near the 3rd, 5th, and 7th harmonics, so that the capacity of some harmonic compensation is reduced. However, in this article, the L-VSC and the LC-VSC share the same high DC voltage, so the characteristics of low DC voltage, low capacity, and low loss of the LC-VSC are not reflected.

In the prior art [3] (H. Bal, X. Wang, F. Blaabjerg, and P. C. Loh, "Harmonic Analysis and Mitigation of Low-Frequency Switching Voltage Source Inverter With Auxiliary VSI," IEEE Journal of Emerging and Selected Topics in Power Electronics, vol. 6, no. 3, pp. 1355-1365, September 2018, doi: 10.1109/JESTPE.2018.2789982.), an independent DC voltage method has been applied to make the L-VSC use a higher DC voltage and the LC-VSC use a lower DC voltage. However, a reasonable design for voltage and capacity is not made in the article, which makes the device proposed in this article be only a simple parallel connection between the L-VSC and the LC-VSC. A unified whole is not formed, so it fails to play its own unique advantages.

In the prior art [4] (publication number: CN101499663A, parallel control method for inverter and inverter), the uniform power distribution of multiple inverter control units was achieved. However, only inductive inverters are power units, so the voltage of each inverter is higher, which results in higher overall loss. For the above-mentioned structure, in the prior art [5] (publication number: CN 102842921B, parallel voltage control method for multiple inverters in microgrid under robust power droop control), power distribution among multiple parallel L-VSCs was accurately controlled by introducing a virtual-impedance multi-loop voltage control method. In the prior art [6] (publication number: CN100477442C, medium-voltage mixed active power filter), a single LC-VSC was used for compensation to achieve the effect of low voltage operation.

In summary, in the above-mentioned application method for parallel connection between the high-power energy compensators and converters, although there are L-VSC and LC-VSC combined methods, none of them are implemented: to guarantee the same performance as the LC-VSC and the L-VSC under certain conditions, and to achieve the effect of lower capacity.

SUMMARY

The technical problem to be solved in the present disclosure is to provide a capacity design method for a parallel multi-converter, by which an L-VSC and an LC-VSC have the same current generating ability, and the total voltage capacity is lower.

To solve the above-mentioned technical problems, the present disclosure adopts the following technical solution: provided is a capacity design method for a parallel multi-converter, including the steps of:

acquiring an electrical parameter of an inductive voltage source converter to construct a first output current model;

acquiring an electrical parameter of a capacitive voltage source converter to construct a second output current model;

correlating the first output current model to the second output current model at the same preset output current to generate a DC voltage relationship model;

generating a capacity relationship model according to a relationship between coupling inductance in the inductive voltage source converter and coupling inductance in the capacitive voltage source converter and the DC voltage relationship model; and acquiring an inductive voltage source converter capacity corresponding to the inductive voltage source converter and a capacitive voltage source converter capacity corresponding to the capacitive voltage source converter according to the capacity relationship model.

The present disclosure has the beneficial effects that a first output current model and a second output current model are generated by respectively acquiring electrical parameters of an inductive voltage source converter and a capacitive voltage source converter, and the first output current model and the second output current model are integrated under the same output current condition, so that it may be ensured that the inductive voltage source converter and the capacitive voltage source converter have the same current generating ability; and meanwhile, a coupling inductance relationship between the inductive voltage source converter and the capacitive voltage source converter is combined to further obtain the optimal capacity value of the inductive voltage source converter and the optimal capacity value of the capacitive voltage source converter. Therefore, not only is it ensured that the L-VSC and the LC-VSC have the same current generating ability, but also the multi-converter has lower total voltage capacity, which is significant to the promotion of a high-capacity parallel converter and further construction of a green and intelligent grid.

BRIEF DESCRIPTION OF THE DRAWINGS

FIG. 1 is a process view showing steps of a capacity design method for a parallel multi-converter in an embodiment of the present disclosure.

DETAILED DESCRIPTION OF THE EMBODIMENTS

Figure 2:
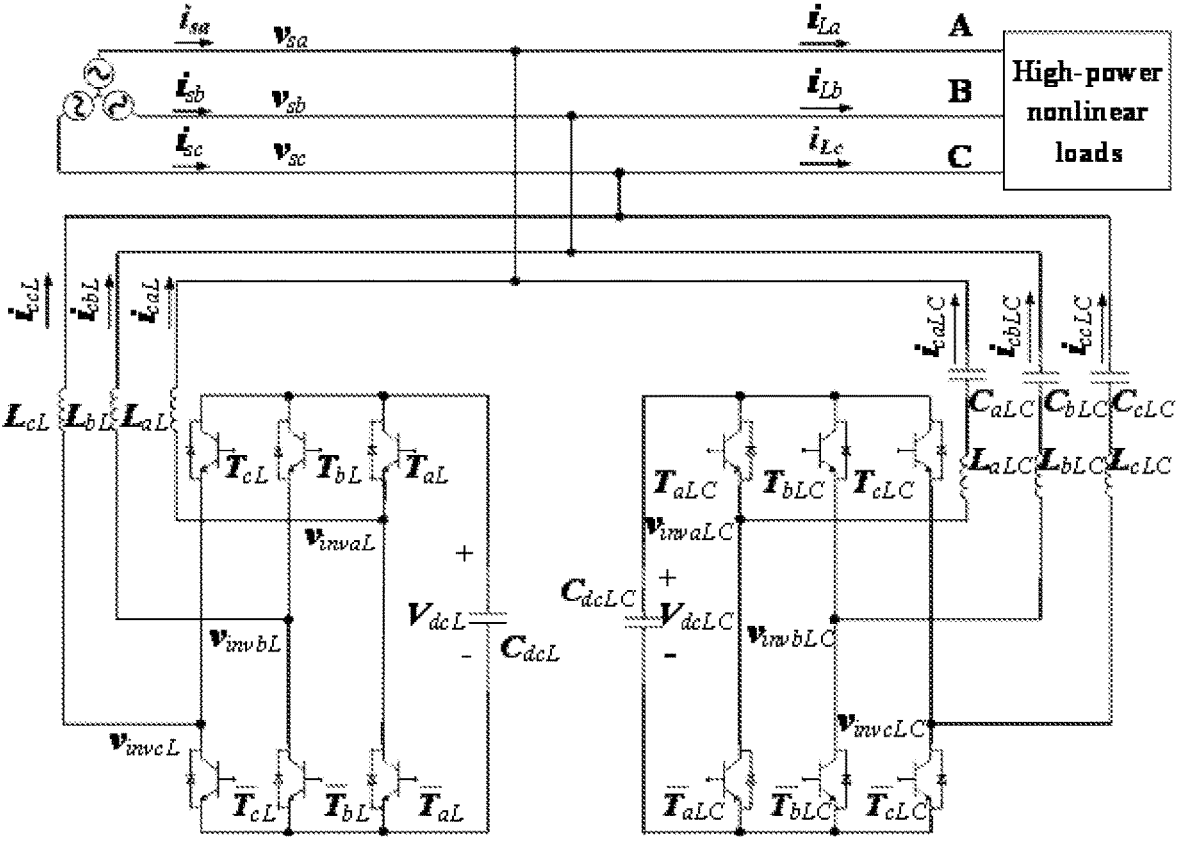
FIG. 2 is a schematic view showing a circuit structure of a parallel multi-converter in an embodiment of the present disclosure.

In order to describe the technical contents as well as achieved objectives and effects of the present disclosure in detail, the descriptions will be made below in conjunction with embodiments and in cooperation with the accompanying drawings.

With reference to FIG. 1, provided is a capacity design method for a parallel multi-converter, including the steps of:

an electrical parameter of an inductive voltage source converter is acquired to construct a first output current model;

an electrical parameter of a capacitive voltage source converter is acquired to construct a second output current model;

the first output current model is correlated to the second output current model at the same preset output current to generate a DC voltage relationship model;

a capacity relationship model is generated according to a relationship between coupling inductance in the inductive voltage source converter and coupling inductance in the capacitive voltage source converter and the DC voltage relationship model; and an inductive voltage source converter capacity corresponding to the inductive voltage source converter and a capacitive voltage source converter capacity corresponding to the capacitive voltage source converter are acquired according to the capacity relationship model.

Known from the above-mentioned descriptions, a first output current model and a second output current model are generated by respectively acquiring electrical parameters of an inductive voltage source converter and a capacitive voltage source converter, and the first output current model and the second output current model are integrated under the same output current condition, so that it may be ensured that the inductive voltage source converter and the capacitive voltage source converter have the same current generating ability; and meanwhile, a coupling inductance relationship between the inductive voltage source converter and the capacitive voltage source converter is combined to further obtain the optimal capacity value of the inductive voltage source converter and the optimal capacity value of the capacitive voltage source converter. Therefore, not only is it ensured that the L-VSC and the LC-VSC have the same current generating ability, but also the multi-converter has lower total voltage capacity, which is significant to the promotion of a high-capacity parallel converter and further construction of a green and intelligent grid.

Further, the step that an electrical parameter of an inductive voltage source converter is acquired to construct a first output current model includes:

a three-phase input voltage of a grid is acquired;

an inductance value of the coupling inductance and a three-bridge voltage in the inductive voltage source converter are acquired;

the first output current model is constructed according to the three-phase input voltage of the grid as well as the three-phase coupling inductance value and the three-bridge voltage of the inductive voltage source converter:

$$i_{cxL} = \frac{1}{L_{xL}} \int_0^T (v_{invxL} - v_{sx}) dt = \frac{v_{invxL} - v_{sx}}{L_{xL}} \cdot T,$$

wherein $i_{cxL}$ is a three-phase injection current, $L_{xL}$ is the inductance value of the coupling inductance, $v_{sx}$ is the three-phase input voltage of the grid, $v_{invxL}$ is the three-bridge voltage, T is a switching period, and x is phase a, phase b or phase c in three-phase power.

Known from the above-mentioned descriptions, a precise mathematical model is constructed by acquiring the three-phase input voltage of the grid as well as the three-phase coupling inductance value and the three-bridge voltage of the inductive voltage source converter, and thus, the accuracy of calculating an output current of the inductive voltage source converter is improved.

Further, the step that an electrical parameter of a capacitive voltage source converter is acquired to construct a second output current model includes:

a three-phase input voltage of a grid is acquired;

the coupling inductance, a three-bridge voltage, and a three-phase coupling inductance voltage in the capacitive voltage source converter are acquired;

the second output current model is constructed according to the three-phase input voltage of the grid as well as the coupling inductance, the three-bridge voltage, and the three-phase coupling inductance voltage in the capacitive voltage source converter:

$$i_{cxLC} = \left( \frac{v_{invxLC} - v_{sx} + v_{CxLC}(0)}{L_{xLC} \cdot \omega} \right) \sin(\omega T) + i_{cxLC}(0)\cos(\omega T),$$

wherein $i_{cxLC}$ is a three-phase injection current, $L_{xLC}$ is a three-phase coupling inductance value, $v_{sx}$ is the three-phase input voltage of the grid, $v_{invxLC}$ is the three-bridge voltage, T is a switching period, $v_{CxLC}$ is the three-phase coupling inductance voltage, $\Omega$ is an electrical angle which represents an angle among three-phase power, and x is phase a, phase b or phase c in the three-phase power.

Known from the above-mentioned descriptions, a precise mathematical model is constructed by acquiring the three-phase input voltage of the grid as well as the coupling inductance, the three-bridge voltage, and the three-phase coupling inductance voltage in the capacitive voltage source converter, and thus, the accuracy of calculating an output current of the capacitive voltage source converter is improved.

Further, after the step that the first output current model is correlated to the second output current model at the same preset output current to generate a DC voltage relationship model, the capacity design method includes:

data model approximate calculation is performed on the first output current model and the second output current model to obtain an approximate DC voltage relationship model:

$$V_{dcLC} = V_{dcL} - A \cdot V_{sx},$$

wherein $V_{sx}$ is an effective value of a single-phase voltage of the grid, A is a relationship between a DC voltage and a voltage peak of the grid, and a numerical value thereof is related to a line form of the grid, $V_{dcLC}$ is the lowest-limit DC voltage of the capacitive voltage source converter, and $V_{dcL}$ is the lowest-limit DC voltage of the inductive voltage source converter.

Known from the above-mentioned descriptions, the DC voltage relationship model is converted into an approximate DC voltage relationship model in combination with a mathematical approximation method, which not only simplifies the original DC voltage relationship model, but also ensures that the DC voltage relationship model applicable to an actual engineering situation, and thus, the applicability of the model is greatly improved.

Further, the step that a capacity relationship model is generated according to a relationship between coupling inductance in the inductive voltage source converter and coupling inductance in the capacitive voltage source converter and the DC voltage relationship model includes:

the coupling inductance in the inductive voltage source converter and the coupling inductance in the capacitive voltage source converter are set to have the same value, and the capacity relationship model is acquired in combination with the approximate DC voltage relationship model:

$$\frac{V_{dcLC} \cdot I_{cx}}{S_{LC}} = \frac{V_{dcL} \cdot I_{cx}}{S_L} - A \cdot V_{sx} \cdot I_{cx},$$

wherein $S_{LC}$ is the capacity of the capacitive voltage source converter, $I_{cx}$ is RMS value of a coupling inductance current, and $S_L$ is the capacity of the inductive voltage source converter; and the step that the capacity corresponding to the inductive voltage source converter and the capacity corresponding to the capacitive voltage source converter are acquired according to the capacity relationship model includes:

$S_{LC}$ and $S_L$ are solved to acquire the capacity corresponding to the inductive voltage source converter and the capacity corresponding to the capacitive voltage source converter.

Known from the above-mentioned descriptions, by setting the coupling inductance in the inductive voltage source converter and the coupling inductance in the capacitive voltage source converter to have the same value, the inductive voltage source converter and the capacitive voltage source converter have the same current output ability, and the corresponding capacity relationship model is further acquired, so that the capacity of the inductive voltage source converter and the capacity of the capacitive voltage source converter are acquired.

Further, the step that the capacity corresponding to the capacitive voltage source converter is acquired according to the capacity relationship model further includes:

a voltage constraint model is set to limit a low-limit DC voltage of the capacitive voltage source converter;

wherein the voltage constraint model is:

$$V_{dcLC} \geq A \cdot \sqrt{V_{sx}^2 \cdot \left(1 - \frac{Q_{Lf}}{Q_{LC}}\right)^2 + \sum_{n=2}^{\infty} I_{cxn}^2 X_{LCn}^2},$$

wherein $Q_{Lf}$ is an actually measured reactive power of a load, $Q_{LC}$ is reactive power provided by a coupling part, $I_{cxn}$ is a measured DC current value of each harmonic emitted by the converter, and $X_{LCn}$ is the corresponding impedance of the coupling part at the $n^{th}$ harmonic.

Known from the above-mentioned descriptions, the lowest-limit operation condition of the model is guaranteed by constructing a design model of the capacitive voltage source converter of which the lowest-limit DC voltage satisfies the lowest limit, so that the performance of the capacitive voltage source converter can be improved in an actual application.

Further, the step that a voltage constraint model is set to limit a low-limit DC voltage of the capacitive voltage source converter includes:

the actually measured reactive power of the load and the reactive power provided by the coupling part are acquired according to the voltage frequency of the grid as well as the coupling inductance and a capacitance value in the capacitive voltage source converter:

$$Q_{LC} = \left(2\pi f L_{xLC} - \frac{1}{2\pi f C_{xLC}}\right) \cdot V_{sx}^2,$$

$$X_{LCn} = \left(2\pi f n L_{xLC} - \frac{1}{2\pi f C_{xLC}}\right),$$

wherein L and C are respectively the coupling inductance and the capacitance value of the capacitive voltage source converter, and f is the voltage frequency of the grid.

Known from the above-mentioned descriptions, the actually measured reactive power of the load and the reactive power provided by the coupling part are controlled according to the voltage frequency of the grid as well as the coupling inductance and the capacitance value in the capacitive voltage source converter, and thus, the reliability of the design model of the capacitive voltage source converter of which the lowest-limit DC voltage satisfies the lowest limit is guaranteed.

Further, the step that the capacity corresponding to the inductive voltage source converter is acquired according to the capacity relationship model further includes:

a voltage constraint model is set to limit a low-limit DC voltage of the inductive voltage source converter;

wherein the voltage constraint model is:

$$V_{dcL} \geq A \cdot \sqrt{V_{sx}^2 + \sum_{n=2}^{\infty} I_{cxn}^2 X_{Ln}^2},$$

wherein $X_{Ln}$ is impedance corresponding to the coupling part at the $n^{th}$ harmonic.

Known from the above-mentioned descriptions, the lowest-limit operation condition of the model is guaranteed by constructing a design model of the inductive voltage source converter of which the lowest-limit DC voltage satisfies the lowest limit, so that the performance of the inductive voltage source converter can be improved in an actual application.

In order to solve the above-mentioned technical problems, the present disclosure adopts the technical solutions.

Provided is a parallel multi-converter including an inductive voltage source converter and a capacitive voltage source converter; and the inductive voltage source converter and the capacitive voltage source converter are connected in parallel, with output ends being used to be connected with a three-phase common connection point of a grid.

Further, the parallel multi-converter includes multiple groups of DC capacitors, electronic power switches, capacitors and inductors;

six groups of the electronic power switches are connected in parallel after being serially connected in pairs to form three bridge arms;

the three bridge arms are connected in parallel with the DC capacitors to form three-phase bridge units;

the inductive voltage source converter includes a group of three-phase bridge units and three groups of inductors; each phase in the three-phase bridge units is connected in series with a group of inductors to form the inductive voltage source converter;

the capacitive voltage source converter includes a group of three-phase bridge units, three groups of inductors and three groups of capacitors; each phase in the three-phase bridge units is connected in series with a group of inductors and capacitors to form the capacitive voltage source converter; and the inductors in the inductive voltage source converter and the inductors in the capacitive voltage source converter have the same electrical properties.

The above-mentioned parallel multi-converter and the capacity design method therefor in the present disclosure are applicable to power distribution of different types of grids such as a single-phase grid system, a three-phase three-wire grid system and a three-phase four-wire grid system, which will be described as below with specific embodiments.

Embodiment 1

Figure 3:
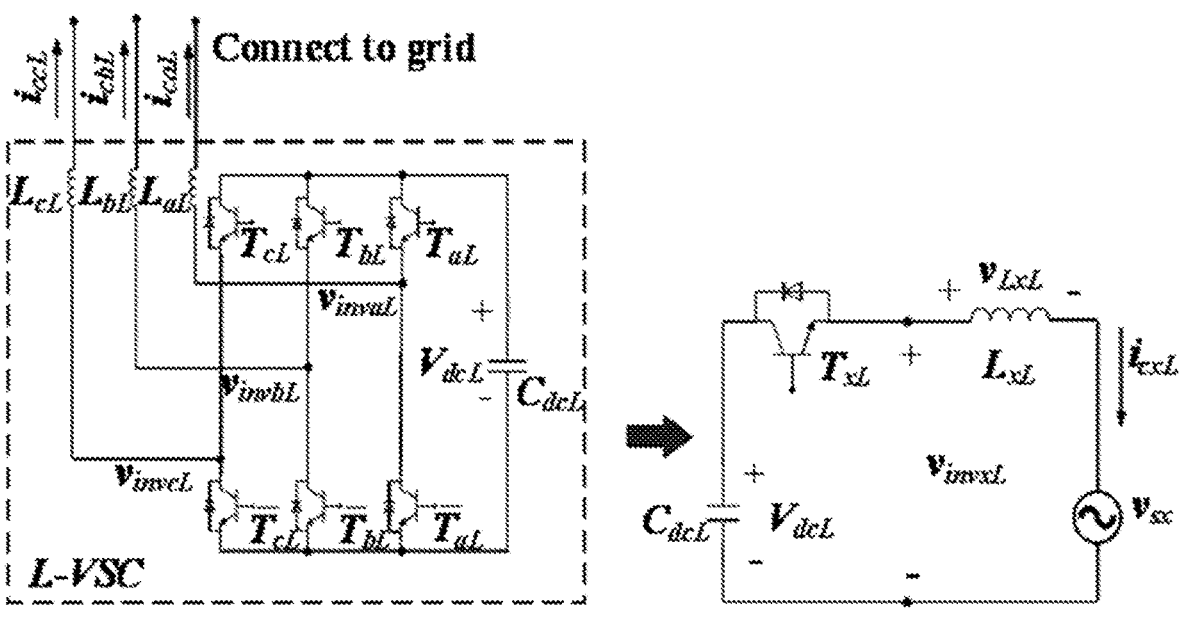
FIG. 3 is a schematic view showing an equivalent circuit structure of an inductive voltage source converter of a parallel multi-converter in an embodiment of the present disclosure.
Figure 4:
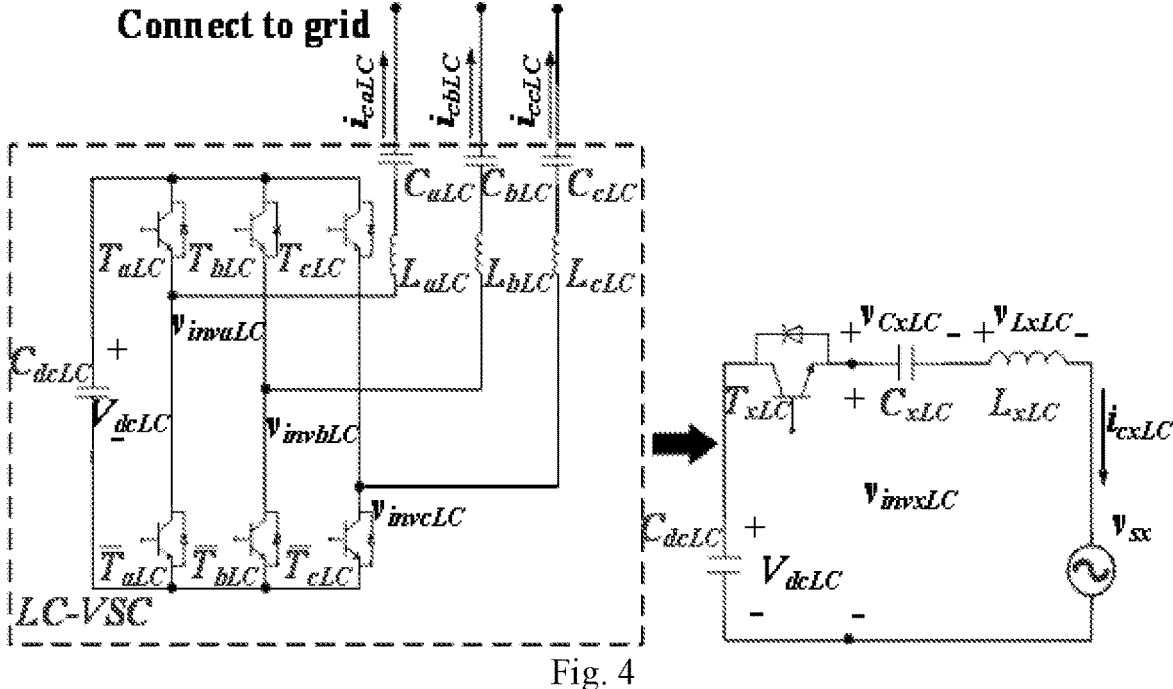
FIG. 4 is a schematic view showing an equivalent circuit structure of a capacitive voltage source converter of a parallel multi-converter in an embodiment of the present disclosure.

With reference to FIG. 1, provided is a capacity design method for a parallel multi-converter, including the steps of:

S1, an electrical parameter of an inductive voltage source converter is acquired to construct a first output current model, which specifically includes:

with reference to FIG. 2 and FIG. 3, FIG. 3 is an equivalent model of the inductive voltage source converter; in FIG. 3, a circuit at the left side is an L-VSC circuit in FIG. 2, and the right side is an equivalent model of the L-VSC circuit;

a three-phase input voltage of a grid is acquired;

an inductance value of the coupling inductance and a three-bridge voltage in the inductive voltage source converter are acquired;

the first output current model is constructed according to the three-phase input voltage of the grid as well as the three-phase coupling inductance value and the three-bridge voltage of the inductive voltage source converter:

$$i_{cxL} = \frac{1}{L_{xL}} \int_0^T (v_{invxL} - v_{sx})dt = \frac{v_{invxL} - v_{sx}}{L_{xL}} \cdot T, \quad (1)$$

wherein $i_{cxL}$ is a three-phase injection current, $L_{xL}$ is the inductance value of the coupling inductance, $v_{sx}$ is the three-phase input voltage of the grid, $v_{invxL}$ is the three-bridge voltage, T is a switching period, and x is phase a, phase b or phase c in three-phase power;

S2, an electrical parameter of a capacitive voltage source converter is acquired to construct a second output current model, which specifically includes:

with reference to FIG. 4, FIG. 4 is an equivalent model of the capacitive voltage source converter; in FIG. 4, a circuit at the left side is an LC-VSC circuit in FIG. 2, and the right side is an equivalent model of the LC-VSC circuit;

a three-phase input voltage of a grid is acquired;

the coupling inductance, a three-bridge voltage, and a three-phase coupling inductance voltage in the capacitive voltage source converter are acquired;

the second output current model is constructed according to the three-phase input voltage of the grid as well as the coupling inductance, the three-bridge voltage, and the three-phase coupling inductance voltage in the capacitive voltage source converter:

$$i_{cxLC} = \left( \frac{v_{invxLC} - v_{sx} + v_{CxLC}(0)}{L_{xLC} \cdot \omega} \right) \sin(\omega T) + i_{cxLC}(0)\cos(\omega T), \quad (2)$$

wherein $i_{cxLC}$ is a three-phase injection current, $L_{xLC}$ is a three-phase coupling inductance value, $v_{sx}$ is the three-phase input voltage of the grid, $v_{invxLC}$ is the three-bridge voltage, T is a switching period, $V_{CxLC}$ is the three-phase coupling inductance voltage, $\Omega$ is an electrical angle which represents an angle among three-phase power, and x is phase a, phase b or phase c in the three-phase power;

S3, the first output current model is correlated to the second output current model at the same preset output current to generate a DC voltage relationship model, that is, a corresponding parallel equation is acquired in combination with the above-mentioned equations (1) and (2):

$$i_{cxL} = i_{cxLC} =$$
$$\left( \frac{v_{invxL} - v_{sx}}{L_{xL}} \right) \cdot T = \left( \frac{v_{invxLC} - v_{sx} + v_{CxLC}(0)}{L_{xLC} \cdot \omega} \right) \sin(\omega T) + i_{cxLC}(0)\cos(\omega T), \quad (3)$$

the equation (3) is a voltage required by the LC-VSC and the L-VSC under the condition of the same output current; in an optional embodiment, in view of the mathematical approximation and the coupling inductance under the same condition, the equation (3) is approximately equivalent to obtain an approximate DC voltage relationship model:

$$V_{dcLC} = V_{dcL} - A \cdot V_{sx} \quad (4),$$

wherein $V_{sx}$ is an effective value of a single-phase voltage of the grid; with reference to table 1, A is a relationship between a DC voltage and a voltage peak of the grid, and a numerical value thereof is related to a line form of the grid; $V_{dCLC}$ is the lowest-limit DC voltage of the capacitive voltage source converter; and $V_{dcL}$ is the lowest-limit DC voltage of the inductive voltage source converter;

TABLE 1

| Relationship between DC voltage and voltage peak of grid | | | |
|---|---|---|---|
| Form of grid | Single-phase system | Three-phase three-wire system | Three-phase four-wire system |
| Value of A | $\sqrt{2}$ | $\sqrt{6}$ | $2\sqrt{2}$ |

Figure 5:
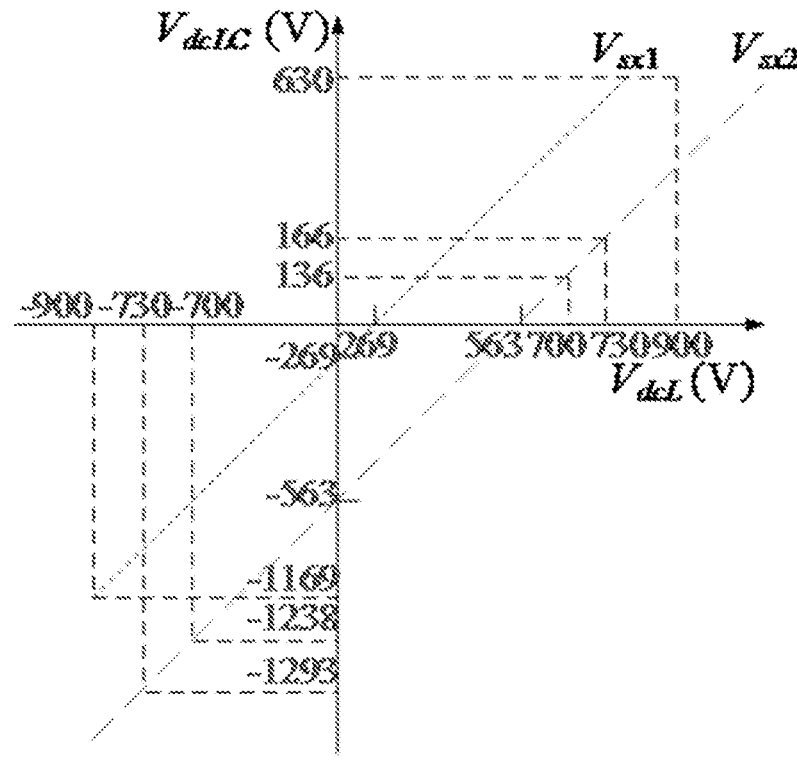
FIG. 5 is a view showing an equivalent DC voltage relationship between an LC-VSC and an L-VSC of a parallel multi-converter in an embodiment of the present disclosure.

S4, a capacity relationship model is generated according to a relationship between coupling inductance in the inductive voltage source converter and coupling inductance in the capacitive voltage source converter and the DC voltage relationship model, which specifically includes:

the coupling inductance in the inductive voltage source converter and the coupling inductance in the capacitive voltage source converter are set to have the same value, and the capacity relationship model is acquired in combination with the approximate DC voltage relationship model:

$$\frac{V_{dcLC} \cdot I_{cx}}{S_{LC}} = \frac{V_{dcL} \cdot I_{cs}}{S_L} - A \cdot V_{sx} \cdot I_{cx}, \quad (5)$$

wherein $S_{LC}$ is the capacity of the capacitive voltage source converter, $I_{cx}$ is a coupling inductance current, and $S_L$ is the capacity of the inductive voltage source converter;

the capacity relationship model is based on a capacity design relationship between the LC-VSC and the L-VSC of the approximate DC voltage relationship model (4), and thus, it is ensured that the LC-VSC and the L-VSC may output the same current;

S5, the capacity corresponding to the inductive voltage source converter and the capacity corresponding to the capacitive voltage source converter are acquired according to the capacity relationship model; $S_{LC}$ and $S_L$ are solved to acquire the capacity corresponding to the inductive voltage source converter and the capacity corresponding to the capacitive voltage source converter, which specifically includes:

with reference to FIG. 5, in correspondence to the different voltage situations of the grid, there is a corresponding relationship between the capacity of the LC-VSC and the capacity of the L-VSC or the DC voltage; that is, the capacity corresponding to the inductive voltage source converter and the capacity corresponding to the capacitive voltage source converter may be acquired; for example, points (700, 136), (730, 166) and (900, 630) in the figure are relationships, corresponding to [1], [2], and [3] in table 2, between the capacity of the LC-VSC and the capacity of the L-VSC;

Embodiment 2

Compared with embodiment 1, the present embodiment differs in that voltage constraint models are set to limit the lowest DC voltages of the LC-VSC and the L-VSC;

the voltage constraint model corresponding to the LC-VSC is described as follows:

a voltage constraint model is set to limit a low-limit DC voltage of the capacitive voltage source converter;

wherein the voltage constraint model is:

$$V_{dcLC} \geq A \cdot \sqrt{V_{sx}^2 \cdot \left(1 - \frac{Q_{Lf}}{Q_{LC}}\right)^2 + \sum_{n=2}^{\infty} I_{cxn}^2 X_{LCn}^2}, \quad (6)$$

wherein $Q_{Lf}$ is an actually measured reactive power of a load, $Q_{LC}$ is reactive power provided by a coupling part, $I_{cxn}$ is a measured DC current value of each harmonic emitted by the converter, and $X_{LCn}$ is the corresponding impedance of the coupling part at the $n^{th}$ harmonic;

the actually measured reactive power of the load and the reactive power provided by the coupling part are acquired according to the voltage frequency of the grid as well as the coupling inductance and a capacitance value in the capacitive voltage source converter:

$$Q_{LC} = \left(2\pi f L_{xLC} - \frac{1}{2\pi f C_{xLC}}\right) \cdot V_{sx}^2, \quad (7)$$

11
12

-continued $$X_{LC} = \left(2\pi f n L_{xLC} - \frac{1}{2\pi f C_{xLC}}\right), \tag{8}$$

wherein L and C are respectively the coupling inductance and the capacitance value of the capacitive voltage source converter, and f is the voltage frequency of the grid; the voltage constraint model corresponding to the L-VSC is described as follows:

a voltage constraint model is set to limit a low-limit DC voltage of the inductive voltage source converter; wherein the voltage constraint model is:

$$V_{dcL} \geq A \cdot \sqrt{V_{sx}^2 + \sum_{n=2}^{\infty} I_{cxn}^2 X_{:Ln}^2}, \tag{9}$$

wherein $X_{Ln}$ is impedance corresponding to the coupling part at the $n^{th}$ harmonic, that is, $$X_{Ln}=2\pi n f L \tag{10};$$

Figure 6:
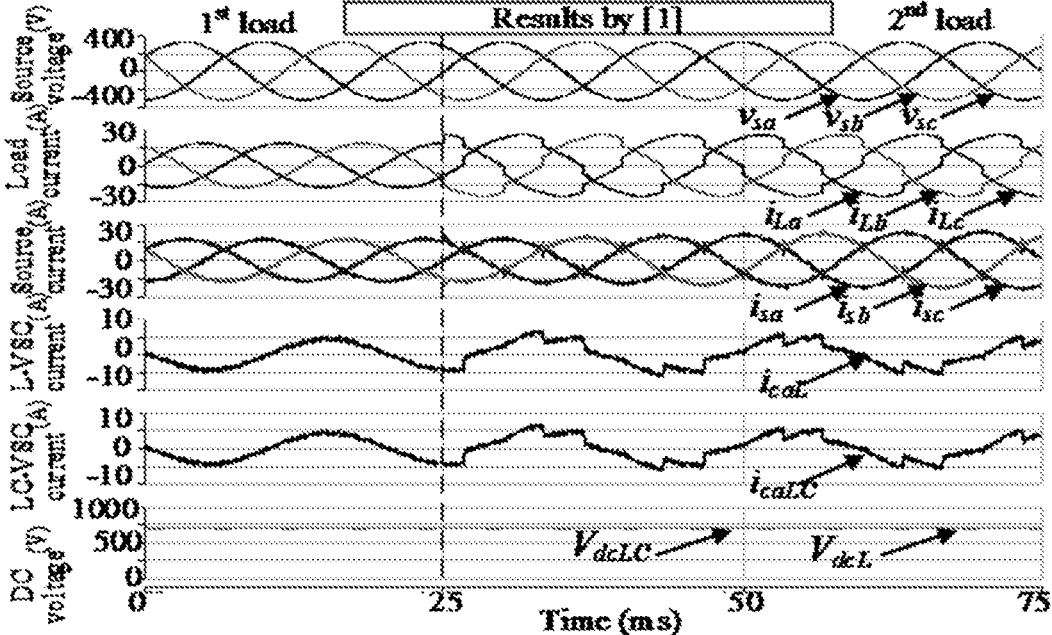
FIG. 6 is a view showing a corresponding simulation waveform based on the prior art [1] used to compensate for a load which is reactive and harmonic.
Figure 7:
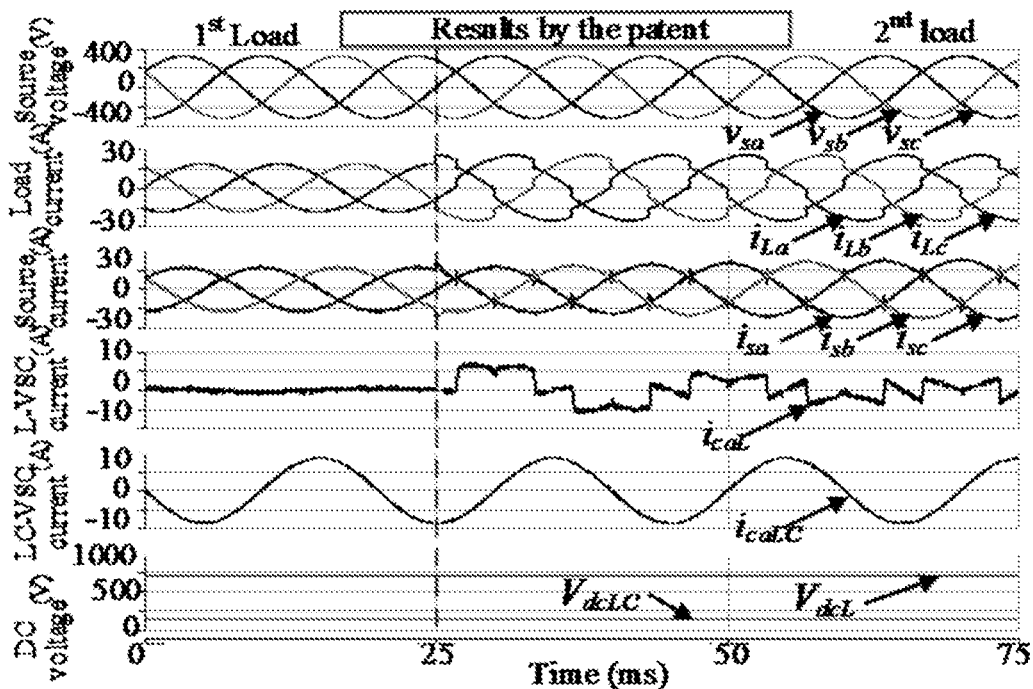
FIG. 7 is a view showing a corresponding simulation waveform when the present disclosure is applied to the prior art [1].
Figure 8:
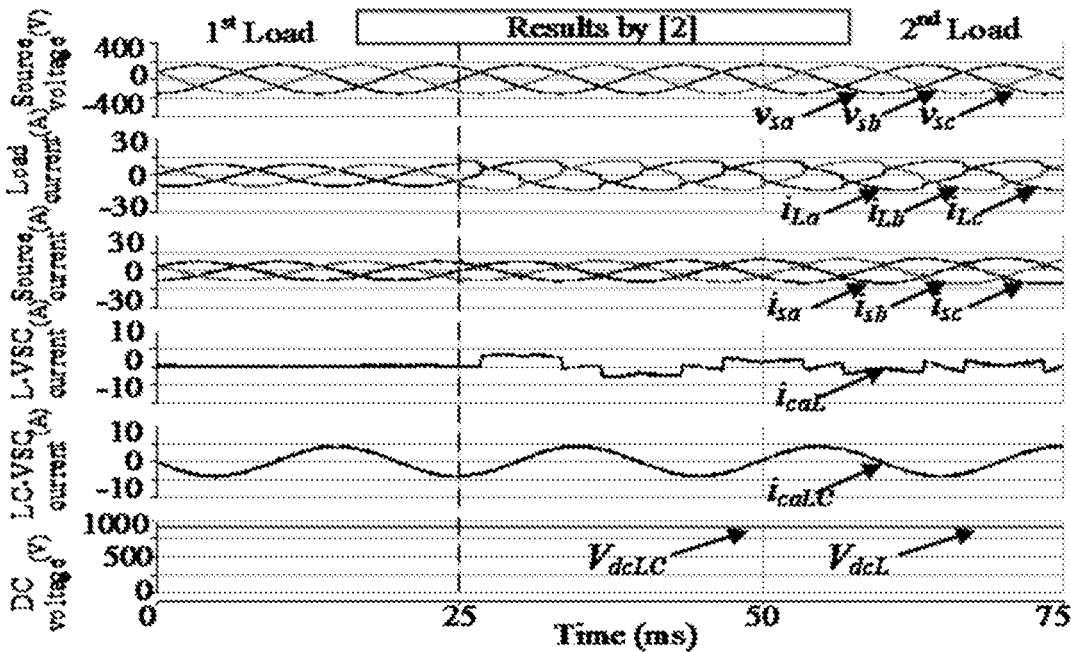
FIG. 8 is a view showing a corresponding simulation waveform based on the prior art [2] used to compensate for a load which is reactive and harmonic.
Figure 9:
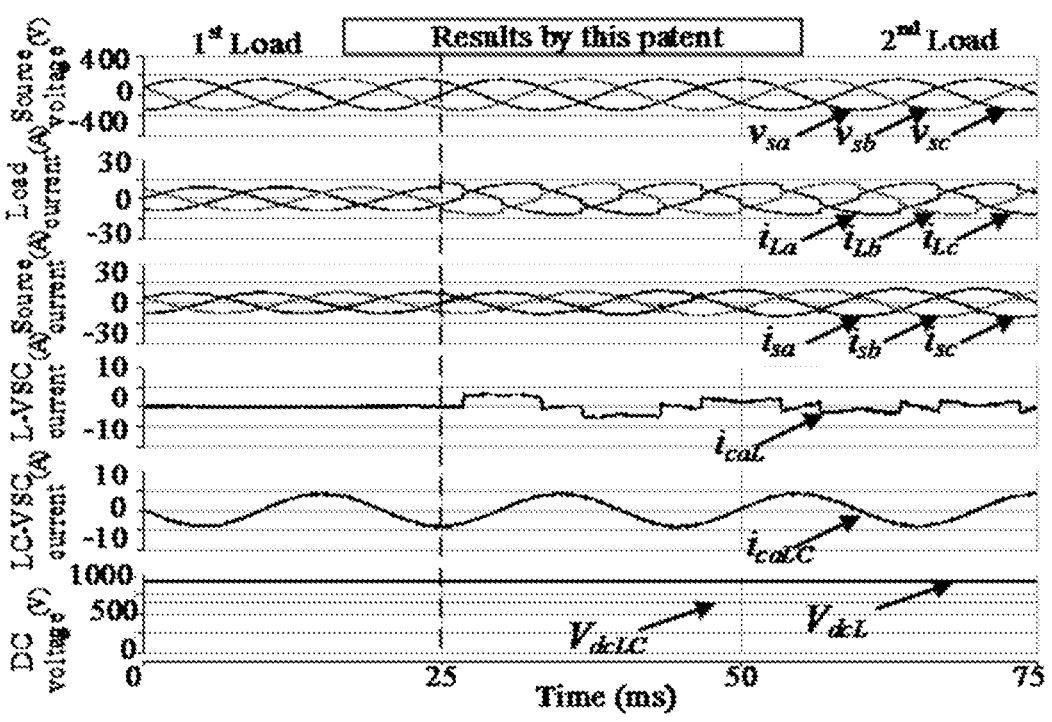
FIG. 9 is a view showing a corresponding simulation waveform when the present disclosure is applied to the prior art [2].
Figure 10:
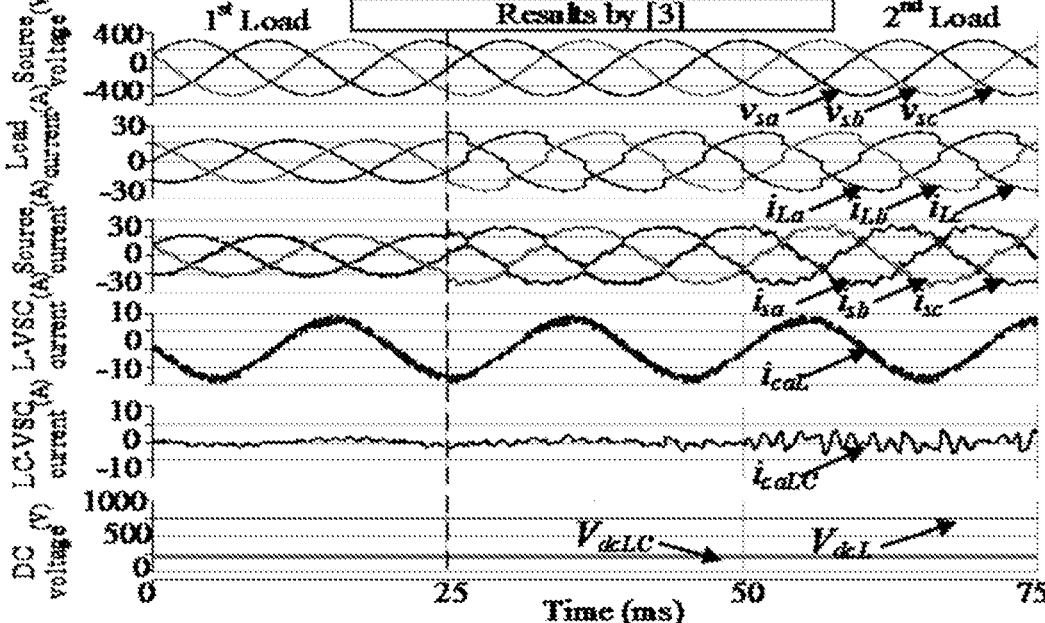
FIG. 10 is a view showing a corresponding simulation waveform based on the prior art [3] used to compensate for a load which is reactive and harmonic.
Figure 11:
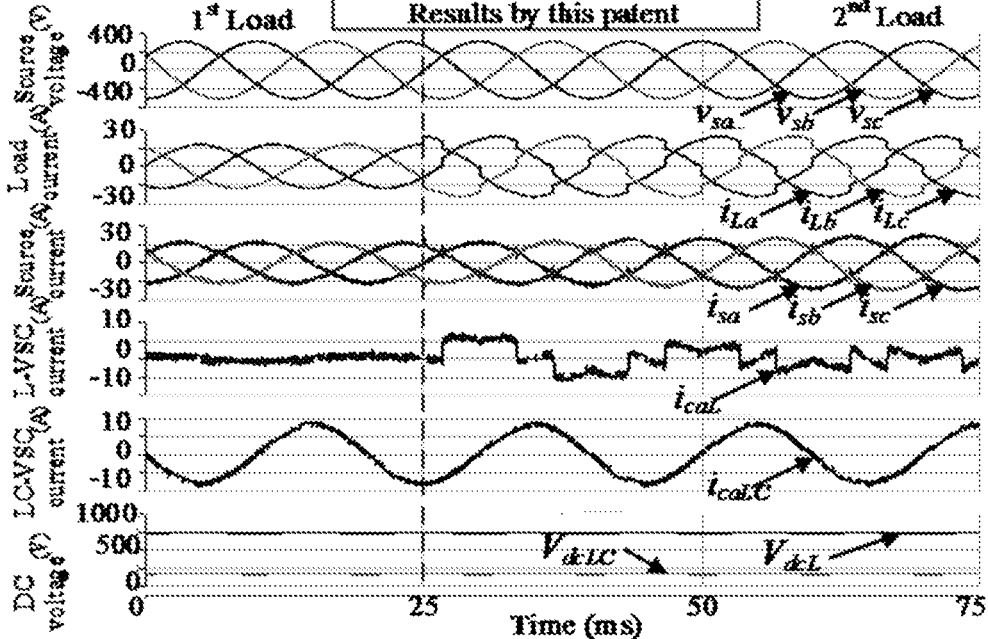
FIG. 11 is a view showing a corresponding simulation waveform when the present disclosure is applied to the prior art [3].

With reference to FIGS. 6 to 11, in simulation examples, source voltages, load currents, source currents, L-VSC output currents (L-VSC currents) , LC-CVSC output currents (LC-VSC currents), and DC voltage waveforms used in the prior art [1], [2], and [3] and the present disclosure to compensate for a load which is reactive and harmonic are respectively tested; wherein the 1st load is a linear load consisting of inductors and resistors in series to provide active and reactive power consumption, the 2nd load is a nonlinear load consisting of six-pulse rectifiers with inductors to generate harmonic and reactive currents.

Wherein FIG. 6 is a view showing a waveform corresponding to the prior art [1]; FIG. 7 is a view showing a corresponding waveform when the present disclosure is applied to the prior art [1]; FIG. 8 is a view showing a waveform corresponding to the prior art [2]; FIG. 9 is a view showing a corresponding waveform when the present disclosure is applied to the prior art [2]; FIG. 10 is a view showing a waveform corresponding to the prior art [3]; FIG. 11 is a view showing a corresponding waveform when the present disclosure is applied to the prior art [3]; and the capacity design methods in the three groups of prior arts and a the capacity design method in the present technical solution are compared to obtain corresponding results as shown in table 2;

voltage source converter and the capacitive voltage source converter are connected in parallel, with output ends being used to be connected with a three-phase common connection point of a grid, specifically:

the parallel multi-converter includes two groups of DC capacitors, electronic power switches, capacitors and inductors; six groups of the electronic power switches are connected in parallel after being serially connected in pairs to form three bridge arms; the three bridge arms are connected in parallel with the DC capacitors to form three-phase bridge units; the inductive voltage source converter includes a group of three-phase bridge units and three groups of inductors; each phase in the three-phase bridge units is connected in series with a group of inductors to form the inductive voltage source converter; the capacitive voltage source converter includes a group of three-phase bridge units, three groups of inductors and three groups of capacitors; each phase in the three-phase bridge units is connected in series with a group of inductors and capacitors to form the capacitive voltage source converter; the inductors in the inductive voltage source converter and the inductors in the capacitive voltage source converter have the same electrical properties; and the parallel multi-converter is controlled based on any method for the parallel multi-converter in embodiment 1 or 2;

wherein each of the electronic power switches includes an insulated gate bipolar thyristors (IGBT) or gate turn-off thyristors (GTO).

In summary, the present disclosure discloses a parallel multi-converter and a capacity design method therefor, by which a first output current model and a second output current model are generated by respectively acquiring electrical parameters of an inductive voltage source converter and a capacitive voltage source converter, and the first output current model and the second output current model are integrated under the same output current condition, so that it may be ensured that the inductive voltage source converter and the capacitive voltage source converter have the same current generating ability; and meanwhile, a coupling inductance relationship between the inductive voltage source converter and the capacitive voltage source converter is combined to further obtain the optimal capacity value of the inductive voltage source converter and the optimal capacity value of the capacitive voltage source converter. Therefore, not only is it ensured that the L-VSC and the

TABLE 2

Comparison between capacity design proposed in accordance with the present disclosure and capacity reduction in corresponding literature

| Relevant prior arts | [1] | | [2] | | [3] | |
|---|---|---|---|---|---|---|
| Voltage of grid | 230 V | | 110 V | | 230 V | |
| Corresponding VSC | L-VSC | LC-VSC | L-VSC | LC-VSC | L-VSC | LC-VSC |
| DC voltages used in the prior arts | 700 V | 700 V | 900 V | 900 V | 730 V | 200 V |
| Equivalent capacity based on voltage design of the present disclosure | 700 V | 136 V | 900 V | 630 V | 730 V | 166 V |
| Capacity reduced as comparison with the prior arts | 0 | 80% | 0 | 30% | 0 | 17% |

Embodiment 3

With reference to FIG. 2, provided is a parallel multi-converter including an inductive voltage source converter and a capacitive voltage source converter; and the inductive LC-VSC have the same current generating ability, but also the multi-converter has lower total voltage capacity, which is significant to the promotion of a high-capacity parallel converter and further construction of a green and intelligent grid.

The above descriptions are not intended to limit the patent scope of the present disclosure, but merely used as embodiments thereof. All equivalent transformations made according to the contents of the description and the accompanying drawings in the present disclosure, no matter whether they are directly or indirectly used in related technical fields, should fall within the protection scope of the present disclosure.

The invention claimed is:

1. A capacity design method for a parallel multi-converter, comprising the steps of:

acquiring, by electrical sensors of the parallel multi-converter, an electrical parameter of an inductive voltage source converter to construct a first output current model;

acquiring, by the electrical sensors of the parallel multi-converter, an electrical parameter of a capacitive voltage source converter to construct a second output current model;

correlating, by a processing unit operatively coupled to the electrical sensors, the first output current model to the second output current model at the same preset output current to generate a direct current (DC) voltage relationship model;

generating, by the processing unit, a capacity relationship model according to a relationship between coupling inductance in the inductive voltage source converter and coupling inductance in the capacitive voltage source converter and the DC voltage relationship model; and acquiring, by the processing unit, an inductive voltage source converter capacity corresponding to the inductive voltage source converter and a capacitive voltage source converter capacity corresponding to the capacitive voltage source converter according to the capacity relationship model.

2. The capacity design method for the parallel multi-converter of claim 1, wherein the step of acquiring an electrical parameter of an inductive voltage source converter to construct a first output current model comprises:

acquiring a three-phase input voltage of a grid;

acquiring an inductance value of the coupling inductance and a three-bridge voltage in the inductive voltage source converter;

constructing the first output current model according to the three-phase input voltage of the grid as well as the three-phase coupling inductance value and the three-bridge voltage of the inductive voltage source converter:

$$i_{cxL} = \frac{1}{L_{xL}} \int_0^T (v_{invxL} - v_{sx})dt = \frac{v_{invxL} - v_{sx}}{L_{xL}} \cdot T,$$

wherein $i_{cxL}$ is a three-phase injection current, $L_{xL}$ is the inductance value of the coupling inductance, $v_{sx}$ is the three-phase input voltage of the grid, $V_{invxL}$ is the three-bridge voltage, T is a switching period, and x is phase a, phase b or phase c in three-phase power.

3. The capacity design method for the parallel multi-converter of claim 1, wherein the step of acquiring an electrical parameter of a capacitive voltage source converter to construct a second output current model comprises:

acquiring a three-phase input voltage of a grid;

acquiring the coupling inductance, a three-bridge voltage, and a three-phase coupling inductance voltage in the capacitive voltage source converter;

constructing the second output current model according to the three-phase input voltage of the grid as well as the coupling inductance, the three-bridge voltage, and the three-phase coupling inductance voltage in the capacitive voltage source converter:

$$i_{cxLC} = \left( \frac{v_{invxLC} - v_{sx} + v_{CxLC}(0)}{L_{xLC} \cdot \omega} \right) \sin(\omega T) + i_{cxLC}(0)\cos(\omega T),$$

wherein $i_{cxLC}$ is a three-phase injection current, $L_{xLC}$ is a three-phase coupling inductance value, $v_{sx}$ is the three-phase input voltage of the grid, $V_{invxLC}$ is the three-bridge voltage, T is a switching period, $V_{CxLC}$ is the three-phase coupling inductance voltage, $\omega$ is an electrical angle which represents an angle among three-phase power, and x is phase a, phase b or phase c in the three-phase power.

4. The capacity design method for the parallel multi-converter of claim 1, wherein after the step of correlating the first output current model to the second output current model at the same preset output current to generate a DC voltage relationship model, the capacity design method comprises:

performing data model approximate calculation on the first output current model and the second output current model to obtain an approximate DC voltage relationship model:

$$V_{dcLC} = V_{dcL} - A \cdot V_{sx},$$

wherein $V_{sx}$ is an effective value of a single-phase voltage of the grid, A is a relationship between a DC voltage and a voltage peak of the grid, and a numerical value thereof is related to a line form of the grid, $V_{dcLC}$ is the lowest-limit DC voltage of the capacitive voltage source converter, and $V_{dcL}$ is the lowest-limit DC voltage of the inductive voltage source converter.

5. The capacity design method for the parallel multi-converter of claim 4, wherein the step of generating a capacity relationship model according to a relationship between coupling inductance in the inductive voltage source converter and coupling inductance in the capacitive voltage source converter and the DC voltage relationship model comprises:

setting the coupling inductance in the inductive voltage source converter and the coupling inductance in the capacitive voltage source converter to have the same value, and acquiring the capacity relationship model in combination with the approximate DC voltage relationship model:

$$\frac{V_{dcLC} \cdot I_{cx}}{S_{LC}} = \frac{V_{dcL} \cdot I_{cs}}{S_L} - A \cdot V_{sx} \cdot I_{cx},$$

wherein $S_{LC}$ is the capacity of the capacitive voltage source converter, $I_{CX}$ is a coupling inductance current, and $S_L$ is the capacity of the inductive voltage source converter; and the step of acquiring the capacity corresponding to the inductive voltage source converter and the capacity corresponding to the capacitive voltage source converter according to the capacity relationship model comprises:

solving $S_{LC}$ and $S_L$ to acquire the capacity corresponding to the inductive voltage source converter and the capacity corresponding to the capacitive voltage source converter.

6. The capacity design method for the parallel multi-converter of claim 4, wherein the step of acquiring the capacity corresponding to the capacitive voltage source converter according to the capacity relationship model further comprises:

setting a voltage constraint model to limit a low-limit DC voltage of the capacitive voltage source converter;

wherein the voltage constraint model is:

$$V_{dcLC} \geq A \cdot \sqrt{V_{sx}^2 \cdot \left(1 - \frac{Q_{Lf}}{Q_{LC}}\right)^2 + \sum_{n=2}^{\infty} I_{cxn}^2 X_{:LCn}^2},$$

wherein $Q_{Lf}$ is an actually measured reactive power of a load, $Q_{LC}$ is reactive power provided by a coupling part, $I_{cxn}$ is a measured DC current value of each harmonic emitted by the converter, and $X_{LCn}$ is the corresponding impedance of the coupling part at the $n^{th}$ harmonic.

7. The capacity design method for the parallel multi-converter of claim 6, wherein the step of setting a voltage constraint model to limit a low-limit DC voltage of the capacitive voltage source converter comprises:

acquiring the actually measured reactive power of the load and the reactive power provided by the coupling part according to the voltage frequency of the grid as well as the coupling inductance and a capacitance value in the capacitive voltage source converter:

$$Q_{LC} = \left(2\pi f L_{xLC} - \frac{1}{2\pi f C_{xLC}}\right) \cdot V_{sx}^2,$$

$$X_{LCn} = \left(2\pi f n L_{xLC} - \frac{1}{2\pi f C_{xLC}}\right),$$

wherein L and C are respectively the coupling inductance and the capacitance value of the capacitive voltage source converter, and f is the voltage frequency of the grid.

8. The capacity design method for the parallel multi-converter of claim 4, wherein the step of acquiring the capacity corresponding to the inductive voltage source converter according to the capacity relationship model further comprises:

setting a voltage constraint model to limit a low-limit DC voltage of the inductive voltage source converter;

wherein the voltage constraint model is:

$$V_{dcL} \geq A \cdot \sqrt{V_{sx}^2 + \sum_{n=2}^{\infty} I_{cxn}^2 X_{:Ln}^2},$$

wherein $X_{Ln}$ is impedance corresponding to the coupling part at the $n^{th}$ harmonic.

\*    \*    \*    \*    \*